United States Patent
Colja et al.

(10) Patent No.: US 10,027,172 B2
(45) Date of Patent: Jul. 17, 2018

(54) MAINTAINING CONTINUOUS POWER CHARGE IN AN INDUCTIVE-COUPLING SYSTEM

(71) Applicant: LEGGETT & PLATT CANADA CO., Waterloo, Ontario (CA)

(72) Inventors: Renato Colja, Windsor (CA); Xinde Liang, Windsor (CA); Milosz Z. Niec, Tecumseh (CA)

(73) Assignee: L&P Property Management Company, South Gate, CA (US)

( * ) Notice: Subject to any disclaimer, the term of this patent is extended or adjusted under 35 U.S.C. 154(b) by 688 days.

(21) Appl. No.: 14/223,352

(22) Filed: Mar. 24, 2014

(65) Prior Publication Data

US 2015/0270738 A1 Sep. 24, 2015

(51) Int. Cl.
| | |
|---|---|
| H01F 27/42 | (2006.01) |
| H01F 37/00 | (2006.01) |
| H01F 38/00 | (2006.01) |
| H02J 50/12 | (2016.01) |
| H02J 5/00 | (2016.01) |
| H02J 17/00 | (2006.01) |
| H02J 50/80 | (2016.01) |
| H02J 50/10 | (2016.01) |

(52) U.S. Cl.
CPC .............. *H02J 50/12* (2016.02); *H02J 5/005* (2013.01); *H02J 17/00* (2013.01); *H02J 50/10* (2016.02); *H02J 50/80* (2016.02)

(58) Field of Classification Search
CPC .. H02J 7/025; H02J 50/10; H02J 5/005; H02J 17/00; H02J 50/12; H02J 50/80

USPC .......................................................... 307/104
See application file for complete search history.

(56) References Cited

U.S. PATENT DOCUMENTS

| | | | |
|---|---|---|---|
| 7,212,414 B2 | 5/2007 | Baarman | |
| 7,639,514 B2 | 12/2009 | Baarman | |
| 9,124,124 B2 * | 9/2015 | Van Wiemeersch | .... H02J 17/00 |
| 2004/0130915 A1 | 7/2004 | Baarman | |

FOREIGN PATENT DOCUMENTS

WO 2012162288 A1 11/2012

OTHER PUBLICATIONS

Interational Search Report and Written Opinion dated Jun. 8, 2015 in International Application No. PCT/CA2015/050192, 16 pages.
International Preliminary Report on Patentability dated Oct. 6, 2016 in International Application No. PCT/CA2015/050192, 7 pages.
Extended Search Report dated Jan. 2, 2018 in European Patent Application No. 15768753.4, 8 pages.

* cited by examiner

*Primary Examiner* — Richard Tan
(74) *Attorney, Agent, or Firm* — Shook, Hardy & Bacon L.L.P.

(57) ABSTRACT

Maintaining continuous wireless charging of a device includes various elements. Events that may disrupt wireless charging are detected and the disruption circumvented by adjusting functions of an inductive coil. A frequency and power-shifting methodology is employed to achieve the continuous wireless charging. The invention may be implemented into various devices and environments, including vehicle consoles.

18 Claims, 6 Drawing Sheets

MAINTAINING CONTINUOUS POWER CHARGE IN AN INDUCTIVE-COUPLING SYSTEM

BACKGROUND

Technology has been developed to charge electronic devices (e.g., mobile cellular devices, tablet computing devices, and the like) using an inductive coupling. Typically, a primary coil provides wireless charging to a secondary coil, which is integrated with the electronic device. Sometimes, the electronic device emits a notification (e.g., vibration, chirp, etc.) if the charging operations are interrupted.

SUMMARY

An embodiment of the present invention is directed to maintaining a sufficient level of a power supply used to inductively charge an electronic device to reduce interruption in charging operations. Embodiments of the invention are defined by the claims below, not this summary. A high-level overview of various aspects of the invention are provided here for that reason, to provide an overview of the disclosure, and to introduce a selection of concepts that are further described below in the detailed description section. This summary is not intended to identify key features or essential features of the claimed subject matter, nor is it intended to be used as an aid in isolation to determine the scope of the claimed subject matter.

BRIEF DESCRIPTION OF THE DRAWINGS

The present invention is described in detail below with reference to the attached figures, which are incorporated herein by reference, wherein.

DETAILED DESCRIPTION

The subject matter of embodiments of the present invention is described with specificity herein to meet statutory requirements. However, the description itself is not intended to necessarily limit the scope of the claims. Rather, the claimed subject matter might be embodied in other ways to include different elements or combinations of elements similar to the ones described in this document, in conjunction with other present or future technologies. Terms should not be interpreted as implying any particular order among or between various steps herein disclosed unless and except when the order of individual steps is explicitly stated.

In an inductive-charging arrangement between a primary coil and a secondary coil, the primary coil transfers power to the secondary coil. As such, a primary coil can be used to charge an electronic device (e.g., cell phone, tablet computer, etc.) that includes a secondary coil. However, interruptions can occur between the primary coil and the secondary coil that disrupt the transfer of power. For instance, a disruption might occur as a result of a voltage drop or frequency interference. An embodiment of the present invention is directed to anticipating an interruption and changing operations of the primary coil to avoid the disruption. For example, a primary-coil frequency might be changed, or power-shifting methodologies might be employed, to maintain the transfer of power and avert the charging disruption.

Figure 1:
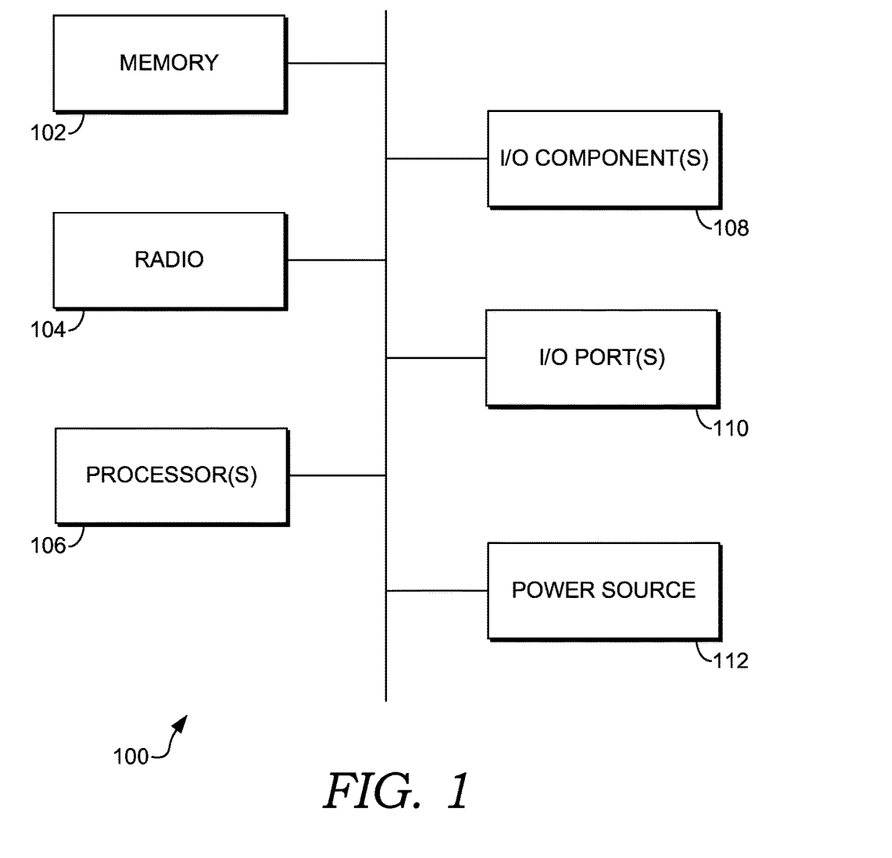
FIG. 1 depicts an illustrative computing environment in accordance with an embodiment of the present invention.

With reference to FIG. 1, an illustrative computing environment 100 is depicted. The computing environment 100 is only one example of a suitable computing environment and is not intended to suggest any limitation as to the scope of use or functionality of the invention. Neither should the computing environment 100 be interpreted as having any dependency or requirement relating to any one or combination of components illustrated in FIG. 1. Although some components are shown in the singular, they might be plural. Components of the computing environment 100 might include memory 102, a radio 104, a processor 106, input/output components 108, input/output ports 110, and a power source 112. The computing environment 100 typically includes a variety of computer-readable media. Computer readable media may be any available media that can be accessed by computer such as volatile, nonvolatile, removable, and non-removable media. By way of example, and not limitation, computer-readable media might include computer storage media and communication media. Computer storage media might include volatile, nonvolatile, removable, and non-removable media implemented in any method or technology for storage of information such as computer-readable instructions, data structures, program modules or other data. Computer storage media includes, but is not limited to, information-delivery media, random access memory (RAM), read-only memory (ROM), electronic erasable programmable read-only memory (EEPROM), flash memory or other memory technology, compact disc read-only memory (CDROM), digital video disc (DVD), holographic media or other optical disk storage, magnetic cassettes, magnetic tape, magnetic disk storage or other magnetic storage devices, and other memory devices. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., Bluetooth, Wi-Fi, ultra-wide band), optical (e.g., infrared) and other wireless media. Any single computer-readable medium, as well as any combination of multiple computer-readable media, are both intended to be included within the scope of the term "computer-readable medium" as used herein.

Memory 102 may include any type of medium that is capable of storing information in a manner readable by a computing device. Memory 102 might include computer storage media in the form of volatile and/or nonvolatile memory such as ROM and RAM. A basic input/output system (BIOS), containing the basic routines that help to transfer information between elements within a computer, is typically stored in ROM. RAM typically contains data and/or program modules that are immediately accessible to and/or presently being operated on by a processing unit.

Radio 104 may include any number or combination of components having the ability to receive and transmit information wirelessly, including a transceiver. As will be appreciated, the radio 104 might be comprised of separate entities such as an individual receiver and transmitter. The radio 104 might include any iteration or number of antennae for transmitting signals, and/or any iteration of x, y, and z-axis antennae for receipt of signals. The number and orientation of antennae or coils might vary based on technical guidelines and practical considerations. The type and magnitude of signals the radio 104 might transmit and/or receive might vary by application. It is understood that the radio 104 may operate in compliance with known practicing standards and technological regulations, which may be relevant in certain contexts.

Processor 106 might include multiple processors that receive instructions and process them accordingly. For instance, the processor 106 might read data from the various components included within the computing environment 100. Input/output components 108 might include items such as keyboards, microphones, touch screens, LED indicator lights, and any other item usable to directly or indirectly input data into a computing device or output data from a computing device. Input/output ports 110 might take on a variety of forms. Illustrative input/output ports 110 include a universal serial bus (USB) jack, stereo jack, infrared port, proprietary communications ports, and the like. Power source 112 includes items such as batteries, fuel cells, or any other component that can provide power to an inductively coupled power circuit. The power source 112 provides power to a primary-coil controller and the various components connected to or contained therein. The power source 112 may be connectable to a controller by cables or cords, or may be connected as part of an interconnected system.

The invention is operational with numerous other general purpose or special purpose computing environments or configurations. Examples of well-known computing systems, environments, and/or configurations that might be suitable for use with the invention include, but are not limited to, personal computers (PCs); handheld and other portable devices such as personal digital assistants (PDAs), and laptop PCs; multiprocessor systems; microprocessor-based systems; programmable consumer electronics; mini-computers; mainframe computers; distributed computing environments that include any of the above systems or devices; vehicle control systems; and the like.

Figure 2:
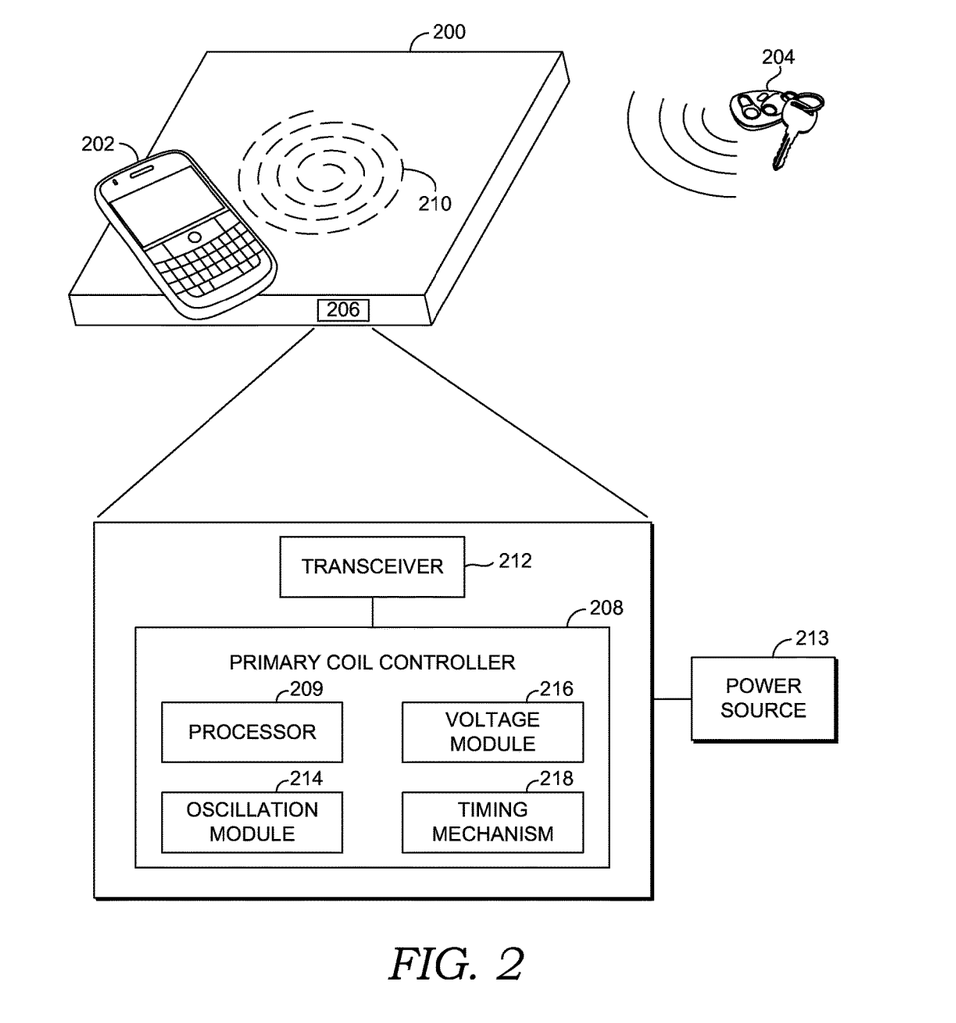
FIG. 2 shows an inductive-charging system in accordance with an embodiment of the present invention.

Referring now to FIG. 2, an environment is depicted that generally includes a primary device 200, a secondary device 202, and a wireless-transceiver device 204. The primary device 200 and the secondary device 202 are inductively coupled, such that the primary device 200 transfers power to the secondary device 202. In this way, an inductively coupled power circuit is formed. FIG. 2 also depicts the wireless-transceiver device 204, which might disrupt the inductive connection between the primary device 200 and secondary device 202. Alternatively, the inductive coupling of the primary device 200 to the secondary device 202 might disrupt communications to the wireless-transceiver device 204.

The primary device 200 includes a computing device 206 for implementing operations that manage and maintain the transfer of power in an inductively coupled power circuit. The computing device 206 is shown in an expanded view for illustrative purposes. The computing device 206 includes a primary-coil controller 208 for governing the operations of a primary coil 210, thereby affecting inductive charging of the secondary device 202. The primary-coil controller 208 includes a processor 209 for executing computer-readable instructions. Also, the primary-coil controller 208 is connected to a power source 213. The primary-coil controller 208 monitors and communicates with components including a primary coil 210, a transceiver 212, an oscillation module 214, a voltage module 216, and a timing mechanism 218. The primary-coil controller 208 may communicate with remote devices, including a secondary device 202 or a wireless-transceiver device 204. The primary-coil controller 208 might be wirelessly or non-wirelessly interconnected with other devices or systems.

The primary-coil controller 208 utilizes primary-coil frequency and power-shifting operations to avoid disruption of the inductive charging of the secondary device 202. The primary-coil controller 208 may receive an indication suggesting that a change in a charging function of the primary coil 210 is likely occur. In response to receipt of said indication, the primary-coil controller 208 may modify one or more operating parameters of the primary coil 210, thereby averting a loss in the transfer of power to the secondary device 202. Thus, using primary-coil frequency and power-shifting operations assists with maintaining continuous inductive charging of the secondary device 202. Maintaining an amount of power at a level sufficient to charge a power supply coupled to a secondary device 202 may reduce the occurrence of the secondary device 202 issuing a power-related notification or engaging a power-loss function. Operating parameters, described hereafter, may include frequency, wavelength, amplitude, pulse-width modulation (PWM), voltage provided to or from the primary coil 210, and duration of said modifications.

The primary coil 210 is connected to the primary-coil controller 208. The primary coil 210 facilitates the transfer of power to the secondary device 202. The transfer of power includes powering or charging the secondary device 202 by inductive coupling. To achieve inductive coupling, the primary coil 210 approaches the resonant frequency of an inductively-coupled power circuit, which when met, induces a voltage in a secondary coil coupled to the secondary device 202. The induced voltage in the secondary coil effectively creates a transfer of power to the secondary device 202. The primary coil 210 may be aligned with and in proximity to a secondary coil in order to induce a voltage and facilitate inductive coupling of a secondary device 202.

The transceiver 212 is coupled to the primary-coil controller 208. The transceiver includes a receiver for detecting signals and a transmitter for transmitting signals. The transceiver 212 may include a three-dimensional antennae arrangement to intercept or detect signals of varying frequencies, which may interfere with or be interfered with by, the inductively coupled power circuit. Alternatively, the transceiver 212 may include one or more antennae appropriate for receiving various signal types, including Near Field Communication (NFC), Radio-frequency identification (RFID), or Bluetooth. Although depicted in the singular, embodiments of the present invention may include multiple transceivers, each utilizing one or more antennae. When the transceiver 212 detects or intercepts a signal, it notifies or communicates the detection to the primary-coil controller 208, an oscillation module 214, or other component.

The oscillation module 214 is coupled to the primary-coil controller 208. The oscillation module 214 analyzes or categorizes signals, including the frequency of a detected signal. The detection of a signal is communicated to the oscillation module 214 from the transceiver 212 directly, or by the primary-coil controller 208. The oscillation module 214 measures any one of the frequency, wavelength, amplitude, and duration of a received signal. The oscillation module 214 might further estimate the distance from the origin of a received signal. In further embodiments, the oscillation module 214 may compare the attributes of a received signal with the attributes or operating parameters of the primary coil. Alternatively, the primary-coil controller 208 uses the oscillation module 214 to perform related operations or to modify operations of the primary coil 210. The primary-coil controller 208 may use the oscillation module 214 to determine whether the frequency of a received signal overlaps with or interferes with the operating frequency of the primary coil 210 (e.g. frequency, wavelength, amplitude, or PWM).

The voltage module 216 monitors or measures changes and fluctuations in power levels at a power source 213 that may affect the primary device 200, the primary coil 210, or the function of the inductively-coupled power circuit. The voltage module 216 monitors one or more of the power source 213 of the primary-coil controller 208, the power supplied to the primary coil 210, the power transferred from the primary coil 210 to a secondary device 202 via the inductively-coupled power circuit, and the power usage of various components connected to or integrated into the primary device 200. Additionally, the voltage module 216 assists with determining an amount of power to be inductively supplied from the primary coil 210 that is a sufficient level to charge a power supply coupled with the secondary device 202. Further, the voltage module 216 may assist with maintaining the amount of power inductively supplied from the primary coil 210 at a sufficient level to charge a power supply coupled with the secondary device 202. Alternatively, the primary-coil controller 208 utilizes the voltage module 216 to implement and perform related operations for managing and modifying the operations of the primary coil 210, including primary-coil frequency and power-shifting operations.

The timing mechanism 218 is engaged when an event predicted to change a charging function of the primary coil 210 is detected, identified, or monitored. Alternatively, the timing mechanism 218 is triggered by or utilized by one or more of the oscillation module 214, the voltage module 216, and the primary-coil controller 208. The timing mechanism 218 may be automatically engaged upon detection of an event, upon receipt of a communication reporting the event, or on command by one or all of the primary-coil controller 208, the oscillation module 214 and the voltage module 216. Alternatively, the timing mechanism 218 might be engaged during or after the detected event. The timing mechanism 218 may be utilized by the primary-coil controller 208 to govern or adjust the duration of primary-coil frequency and power-shifting operations. In one embodiment, the timing mechanism 218 may sustain the primary-coil frequency and power-shifting operations for a preset period of time. In an alternative embodiment, the duration of the primary-coil frequency and power-shifting operations is dynamically determined by the timing mechanism 218 based on the event detected (e.g. type of event, event magnitude, duration of event, etc.). In some embodiments, the timing mechanism 218 might be controlled by, work in tandem with, receive feedback from, or be adjusted by one or both of the oscillation module 214 and the voltage module 216. The timing mechanism 218 includes various preprogrammed, predetermined, or preset time intervals used to effectuate primary-coil frequency and power-shifting operations. Alternatively, the timing mechanism 218 may be plastic, responding to detected events individually. The timing mechanism 218 might independently adjust its operations, or adjust its operations based on communications with the primary-coil controller 208, the oscillation module 214 or the voltage module 216.

FIG. 2 also depicts an exemplary environment in which the primary-coil controller 208 implements primary-coil frequency and power-shifting operations to maintain uninterrupted inductive charging of a secondary device 202. In this way, the primary-coil controller 208 may avoid a disruption in the transfer of power to a secondary device 202 or a trigger of a power-loss function in a secondary device 202. Initially, the primary-coil controller 208 detects an event that is predicted to change a charging function of the primary coil 210. For example, an event is detected by the transceiver 212 and a notification of the detection or event information is relayed to the primary-coil controller 208. Alternatively, the event is detected by the primary-coil controller 208. For example, the primary-coil controller 208 may detect a change in the power source 213. In another example, the primary-coil controller 208 receives a communication reporting the event or its detection, wherein the communication is a notification, alert, message, or signal that is communicated wirelessly or non-wirelessly. Examples of wireless communications include NFC, RFID, and Bluetooth. Non-wireless communications may be transmitted using a Controller Area Network (CAN), Local Interconnect Network (LIN), Universal Serial Bus (USB), FireWire, RS 232, RS 485, and/or other serial interfaces. Non-wireless communications might include parallel communication means, not listed herein. These examples are not intended to suggest any limitation as to the scope of use or functionality of the invention.

An event predicted to change a charging function of the primary coil 210 includes any event which will, is predicted to, or might potentially effectuate a change in the ability of the primary coil 210 to inductively charge a secondary device 202. An event may completely interrupt or terminate the inductive charging function of the primary coil 210 and such interruption may be a momentary, intermittent, or permanent disruption of the inductive charging function. Alternatively, an event might increase or decrease the inductive charging rate of the secondary device 202 without a complete interruption in the inductive charging function of the primary coil 210. As outlined herein, such events may be detected by a variety of components, including those not depicted in FIG. 2.

Upon detection of an event predicted to change a charging function of the primary coil 210, the primary-coil controller 208 might utilize the oscillation module 214 or the voltage module 216 to categorize or analyze the detected event and event attributes. Also, the primary-coil controller 208 might engage said components to measure any of the wavelength, frequency, amplitude, PWM, strength, voltage, current, damping, Q factor, or other characteristics and effects of, the detected event. Additionally, the primary-coil controller 208 might engage the timing mechanism 218 to measure or record any one of the duration of the detected event, the duration and number of a series of detected events, or the time interval between detected events. Alternatively, the primary-coil controller 208 might engage the timing mechanism 218 to measure or record a series of received communications reporting one or more detected events, or the time intervals between said received communications. Also, the timing mechanism 218 might be engaged to govern or control any one of the initiation, termination, and duration of the primary-coil frequency and power-shifting operations. The primary-coil controller 208 might further employ components not included herein or depicted in FIG. 2.

A change in the charging function of the primary coil 210 might occur based on a wireless signal, for example, when a wireless-transceiver device 204 transmits a signal to a vehicle, wherein the vehicle includes the primary coil 210 and the primary-coil controller 208. Additionally, a change in the charging function of the primary coil 210 may occur when the signal of the wireless-transceiver device 204 further initiates vehicle operations, which might affect the function of the inductively-coupled power circuit. A wireless-transceiver device 204 includes a keyless entry device, a keyless ignition device, a key fob, or a smart key. Vehicle operations include locking or unlocking vehicle doors, starting or stopping the vehicle engine, powering the vehicle's electrical system on or off, opening the vehicle trunk compartment, opening or closing vehicle windows, adjusting interior lights or headlamp brightness, adjusting a vehicle seat, adjusting a steering wheel tilt, and/or arming or disarming a vehicle security system. In other aspects, a change in the charging function of the primary coil 210 might be directly caused by the wireless-transceiver device 204 that transmits a wireless signal. For example, frequency interference with the operating frequency of the primary coil 210 might occur when the wireless-transceiver device 204 is in proximity to the inductively coupled power circuit.

Alternatively, a change in the charging function of the primary coil 210 might be caused by non-wireless signals or other factors. For example, vehicle operations that cause a fluctuation in the power source 213 of the primary-coil controller 208 may cause a change in a charging function of a primary coil 210. Said fluctuations might occur when a vehicle operation intermittently uses the power source 213, for example when speeding up, slowing down, or coming to a complete stop (e.g., an electric or hybrid vehicle). In another example, a vehicle might be used to jump-start a second vehicle or power portable electronics (e.g., portable television), thereby causing fluctuations in the power source 213. In further aspects, activation of vehicle operations might cause fluctuations in the power source 213 (e.g., use of sirens, emergency lights, stereo systems, hydraulic-lift systems, and/or tow-bar or hitch systems). In response to said vehicle operations, the primary-coil controller 208 can implement primary-coil frequency and power-shifting operations to assist with or maintain continuous inductive charging of the secondary device 202. In alternative embodiments, a change in the charging function of the primary coil 210 could occur in response to a non-wireless communication with the primary-coil controller 208 or its components, described herein.

The primary device 200, including the primary-coil controller 208 and the primary coil 210, might be installed in a vehicle, wherein a vehicle surface integrates the primary coil 210 and allows for inductive charging of a secondary device 202. Inductive charging surfaces include interior surfaces of vehicles such as dashboards, glove compartments, front seat consoles, back seat consoles, armrests, door pockets, cup holders, overhead storage consoles, seat headrests, and fold-down consoles or trays. Secondary devices that could benefit from an inductive charging surface integrated into a vehicle include devices such as laptop computers, tablet computers, handheld game consoles, portable audio devices, GPS devices, PDAs, cell phones, and emergency signaling devices.

Figure 3:
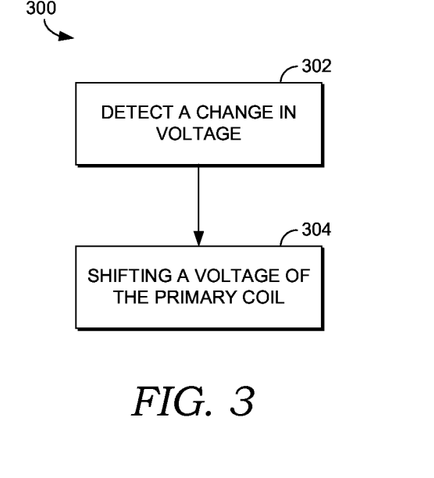
FIG. 3 shows a flow diagram illustrating steps of a method in accordance with an embodiment of the present invention.

FIG. 3 illustrates a flow diagram for executing a method 300 for avoiding charging disruption of an inductive power supply to a second coil by regulating the voltage of the primary coil 210. In one aspect, the method 300 is implemented by the primary device 200, the primary-coil controller 208, and the various components previously discussed. Further, the method 300 might be embodied as computer-executable instructions that are stored on computer-readable media and are executed by a processing device. General reference to FIG. 2 will be made in describing the method of FIG. 3.

Beginning at block 302, the method 300 includes detecting an event that is predicted to change a charging function of the primary coil, wherein the event includes a change in voltage. A change in voltage may be detected by the primary device 200, the primary-coil controller 208, an entity in communication with the primary device 200 or the primary-coil controller 208, and/or a secondary device 202 coupled to a second coil. The change in voltage may be detected in the power source 213 providing power to the primary device 200, the primary-coil controller 208, and/or the primary coil 210. Alternatively, the change in voltage may be detected in the inductive power supplied from the primary coil 210 to the secondary device 202 coupled to a second coil. The detected event may be a change in voltage itself, a harbinger of an imminent change in voltage, or a condition precedent to a change in voltage. In some embodiments, the detected event or the actual change in voltage might be triggered by a wireless-transceiver device 204 such as a keyless entry device, a keyless ignition device, a key fob, or a smart key. Other examples that can cause a fluctuation in the power source 213 and further cause a change in voltage have been previously described.

In one embodiment, detecting an event including a change in voltage may comprise receiving a communication reporting the event. The communication reporting the event might be a wirelessly transmitted communication. In one example, the communication reporting the event may be a notification from a secondary device 202 indicating that it is not receiving a preferred, requisite, or stable transfer of power from the primary coil 210. Alternatively, the communication may be a non-wireless communication transmitted using LIN or CAN, for example. In another example, the communication reporting the event may be a notification from a vehicle controller that the vehicle system is experiencing a change in voltage or a fluctuation in power, wherein the vehicle and the primary device 210 or primary-coil controller 208 share a power source 213. In further aspects of the method 300, a communication reporting the event may precede the event or coincide with the event detection.

Responsive to the event, the method 300 includes shifting a voltage of the primary coil, at block 304. In one aspect, shifting the voltage of the primary coil includes maintaining an amount of power inductively supplied from the primary coil 210 at a level sufficient to charge a power supply coupled with the secondary coil. A shift in voltage of the primary coil might be sustained for a preset period of time, or alternatively, it might be dynamically determined. In one embodiment, the detected event is a signal from a wireless transceiver device 204 initiating vehicle operations (e.g. unlocking the vehicle doors). Upon detection, a shift in the voltage of the primary coil is sustained for a preset period of time that corresponds to the duration of the initiated vehicle operation. A dynamically determined duration of a shift in the voltage of the primary coil might be responsive to monitoring of the power source 213. For example, when a hybrid vehicle is driven in a city, the power source 213 may experience fluctuations as the car speeds up or comes to a stop. In this scenario, the primary-coil controller 208 might monitor the power source 213 and shift the voltage of the primary coil to accommodate for the fluctuations and to maintain the inductively-coupled power circuit. Further embodiments might include determining if the power source 213 is stable, fluctuating, or experiencing intermittent outages.

Figure 4:
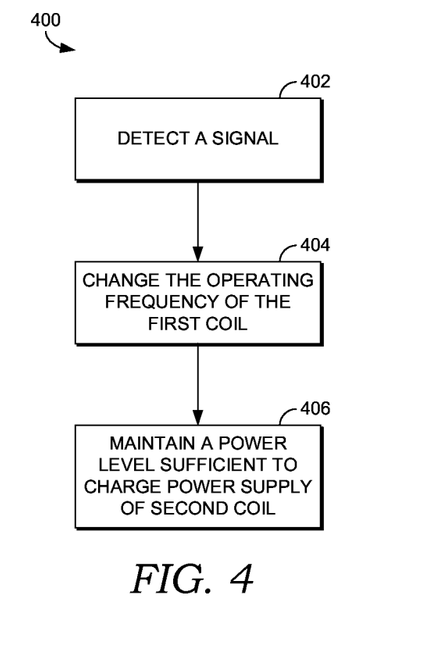
FIG. 4 depicts a flow diagram illustrating steps of a method in accordance with an embodiment of the present invention.

Turning now to FIG. 4, a flow diagram is depicted showing various steps that execute a method 400 method for regulating an inductive power supply provided from a first coil to a second coil to limit inductive charging disruption. Similar to FIG. 3, the method 400 is carried out by the primary device 200, the primary-coil controller 208, and various components in accordance with one embodiment. In addition, the method 400 might be embodied as computer-executable instructions that are stored on computer-readable media and are executed by a processing device. When describing FIG. 4, reference will also be made to FIG. 2.

Initially, at block 402, a signal is detected, wherein the frequency of the signal interferes with an operating frequency of a first coil. A signal may be detected by the primary device 200, the primary-coil controller 208, an entity in communication with the primary device 200 or the primary-coil controller 208, and/or a secondary device 202 coupled to a second coil. The detected signal may interfere, be predicted to interfere, or potentially interfere with the inductive charging function of the first coil. In one embodiment, the frequency of a detected signal is similar to the operating frequency of the first coil, such that the detected signal interferes with the operating frequency. In another embodiment, the frequency of a detected signal is dissimilar to the operating frequency of the first coil; however the amplitude or strength of the detected signal is sufficient to interfere with the operating frequency. Alternatively, a combination of the detected signal's attributes (e.g., frequency, wavelength, amplitude, or duration) may interfere with the operating frequency of the first coil.

The detected signal might originate with any of a wireless-transceiver device 204, a secondary device 202, or any other device capable of transmitting a signal. In one embodiment, the transceiver 212 detects a signal that interferes with the operating frequency of the first coil. In another embodiment, the signal is detected by an external entity or device, and the detection is communicated to the primary device 200 or the primary-coil controller 208. In one aspect, a communication reporting the detected signal may be transmitted wirelessly to the primary device 200 or the primary-coil controller 208. In another example, the detected signal or a communication reporting the detected signal may be transmitted to the primary device 200 or the primary-coil controller 208 using non-wireless communication means, such as LIN or CAN.

At block 404, the method includes changing the operating frequency of the first coil responsive to detecting the signal to avoid interference of the operating frequency with the frequency of the signal, wherein the operating frequency affects an amount of power inductively supplied from the first coil to a second coil. Interference may occur when the frequency of the detected signal overlaps with or is similar to the operating frequency of the first coil. For example, if a low-frequency signal is detected, the operating frequency of the first coil is changed to a frequency dissimilar to the low-frequency signal. The change creates a margin between the modified operating frequency of the first coil and the detected low-frequency signal that is adequate to reduce frequency interference. By avoiding frequency interference, the amount of power inductively supplied from the first coil remains sufficient to charge a power supply coupled with the second coil. Additionally, maintaining a sufficient level of inductive power for charging assists with avoiding a trigger of a power-loss indicator or a power-loss function in a device containing the second coil.

The modified operating frequency of the first coil might be sustained or persist for a preset period of time. In an alternative aspect, the duration of the modified operating frequency may be dynamically determined based on one or more attributes of the detected signal. One or more attributes of the operating frequency, such as frequency, wavelength, amplitude, PWM, duration, and other attributes not listed herein, may be adjusted to avoid interference.

Moving to block 406, the method 400 includes maintaining the amount of power inductively supplied from the first coil at a level sufficient to charge a power supply coupled with the second coil. The amount of power inductively supplied from the first coil at a level sufficient to charge a power supply coupled with the second coil might be preset, predetermined, or preprogrammed. The maintenance of a level sufficient to charge a power supply coupled with the second coil may be determined or governed by the primary device 200, the primary-coil controller 208, or the voltage module 216. In some embodiments, maintaining the level sufficient to charge a power supply coupled with the second coil might prevent a secondary device 202 from issuing a power-change or power-loss indicator, and/or engaging a power-change or power-loss function. In one example, a trigger of a power-loss indicator in a device containing a second coil is avoided by maintaining a sufficient level of power.

In further embodiments, the method 400 allows for changing the operating frequency of the first coil back to a pre-modification state. The pre-modification state might include the operating frequency of the first coil prior to detection of a signal. Alternatively, a pre-modification state might include preprogrammed or baseline operating frequency parameters. In other embodiments, the change of the operating frequency of the first coil back to a pre-modification state might persist for a preset or predetermined period of time, or persist based on the duration or other attributes of the detected signal.

Figure 5:
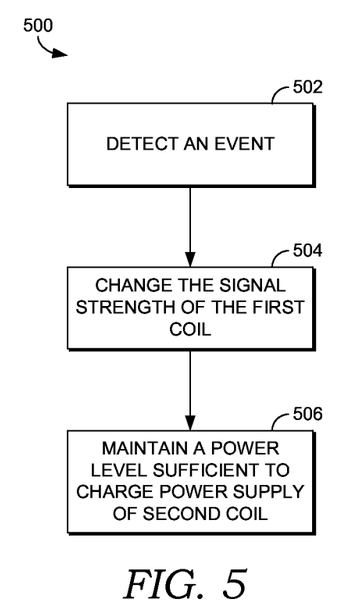
FIG. 5 illustrates a flow diagram depicting steps of a method in accordance with an embodiment of the present invention.

FIG. 5 illustrates an alternative method for detecting events that disrupt inductive charging and preventing the disruption. Various components referenced in FIG. 2 may be utilized to implement or carry out the method 500 in accordance with embodiments of the present invention. In addition, the method 500 might be embodied as computer-executable instructions that are stored on computer-readable media and are executed by a processing device.

At block 502, the method includes detecting an event that is predicted to disrupt the inductive charging function of the first coil. The nature of events that might disrupt inductive charging have been discussed previously (e.g. a change in voltage, an interfering frequency). Next, at block 504, the signal strength of a first coil is changed, wherein the signal strength affects an amount of power inductively supplied from the first coil to a second coil. The signal strength of the first coil might be changed by adjusting or modifying any of the frequency, amplitude, PWM, and/or other parameters of the first coil. In one example, the strength or amplitude of the operating frequency of the first coil may be increased to assist in preventing disruption of inductive charging. Finally, the method comprises, at block 506, maintaining the change in signal strength of the first coil to facilitate the inductive charging function of the first coil, wherein the amount of power inductively supplied is sufficient to charge a device coupled with the second coil. The level of power sufficient to charge the device coupled with the second coil might prevent the device coupled with the second coil from issuing a power-change indicator or engaging a power-loss function.

Figure 6:
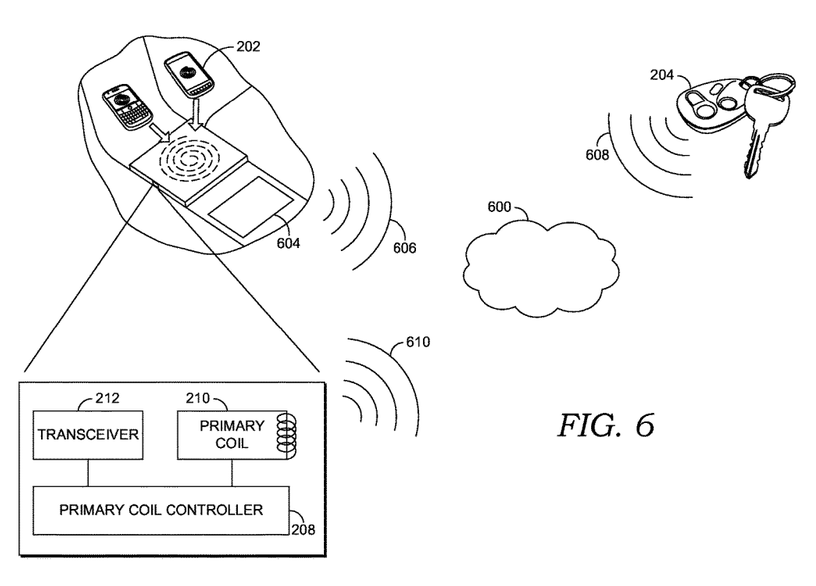
FIG. 6 illustrates a context in which embodiments of the present invention might be implemented.

At FIG. 6, a wireless environment 600 is depicted in which the primary-coil controller 208 may detect various signals emanating from other devices and employ previously described methods to maintain a continuous transfer of power from the primary coil 210 to a secondary coil. As illustrated, multiple signals radiate into a wireless environment 600, wherein the signals interact with one another or can be received by various devices.

For example, a vehicle controller 604 transmits a low-frequency signal 606 into the wireless environment 600 to communicate with a wireless-transceiver device 204. The wireless-transceiver device 204 transmits an ultra-high frequency signal 608 into the wireless environment 600 while detecting the low-frequency signal 606. The ultra-high frequency signal 608 may trigger vehicle operations when received by the vehicle controller 604, wherein vehicle operations might cause a change in voltage. Or, the low-frequency signal 606 and ultra-high frequency signal 608 might instead interfere with the operating frequency 610 of the primary coil 210 in the inductively coupled power circuit.

In another example, the vehicle controller 604 transmits a low-frequency signal 606 that is detected by the transceiver 212 and the detection is communicated to the primary-coil controller 208. The low-frequency signal 606 might interfere with the operating frequency 610 of the primary coil 210, thereby negatively impacting a charging function of the primary coil 210. Upon detection, the primary-coil controller 208 might change the operating frequency of the primary coil 210 using primary-coil frequency and power-shifting operations. In this way, frequency interference or disruption of the transfer of power to a second coil may be avoided. In further embodiments, the vehicle controller 604 may non-wirelessly communicate a report of an event predicted to change a charging function of the primary coil, wherein the event includes a change in voltage. Upon receiving the communication, the primary-coil controller 208 may use primary-coil frequency and power-shifting operations to shift the voltage of the primary coil 210. In this way, a disruption in the transfer of power to a second coil may be avoided.

In yet another example, the wireless-transceiver device 204 includes a low-frequency receiver. The low-frequency receiver may experience an induced voltage as a result of the operating frequency 610 of the inductively coupled power circuit. The induced voltage might interfere with the low-frequency receiver's ability to receive or detect a low-frequency signal 606 in the wireless environment 600. Such interference may be more pronounced when the wireless-transceiver device 204 is in close proximity to the primary coil 210. Upon detecting the presence or proximity of the wireless-transceiver device 204, the operating frequency 610 of the primary coil 210 might be changed using primary-coil frequency and power-shifting operations. Changing the operating frequency 610 of the primary coil 210 might reduce or eliminate the induced voltage in the low-frequency receiver, thereby allowing the wireless-transceiver device 204 to detect and receive the low-frequency signal 606. In alternative embodiments, the signal strength of a first coil may be increased or decreased in order to reduce or eliminate an induced voltage in the low-frequency receiver coupled to the wireless-transceiver device 204.

Figure 7:
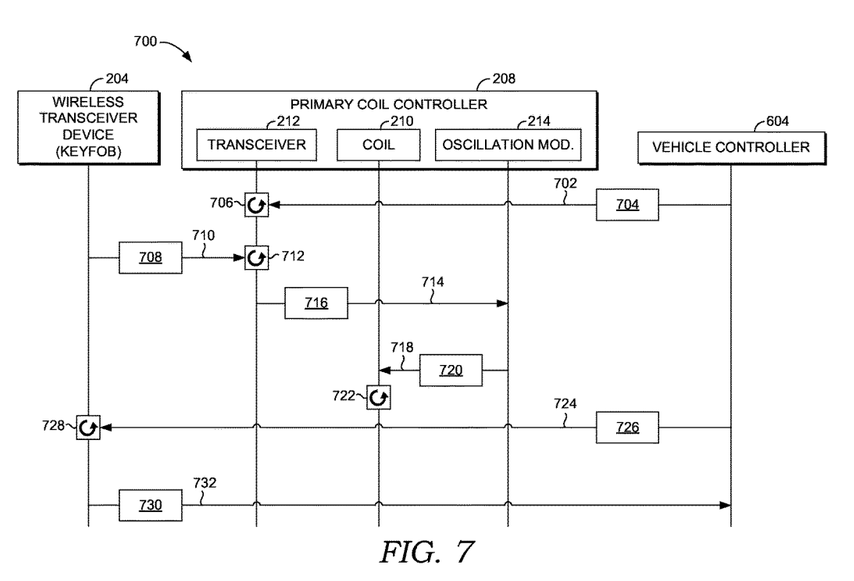
FIG. 7 shows a diagram of component interactions according to one embodiment of the present invention.

FIG. 7 presents a chart 700 illustrating the signals and communications between various devices, including a primary-coil controller 208 for performing primary-coil frequency and power-shifting operations, and a vehicle controller 604. In FIG. 7, a vehicle controller 604 attempts to transmit 702 a low-frequency signal 704 to a key fob 204. However the low-frequency signal 704 is masked by an induced voltage in the key fob 204. The induced voltage is caused by the operating frequency of a primary coil 210, located nearby. However, the low-frequency signal 704 is detected 706 by the transceiver 212 coupled to the primary-coil controller 208. Alternatively, the wireless transceiver device (e.g., a key fob 204) may transmit 710 an ultra-high frequency signal 708, which may also be detected 712 by the transceiver 212.

Upon detection 706 of the low-frequency signal 704, the transceiver 212 communicates 714 signal information 716 to the oscillation module 214, providing notification of the detection. The oscillation module 214 analyzes the signal information 716 and sends 718 modification orders 720 to the primary coil 210 for implementation. The modification orders 720 change 722 the operating frequency or first frequency of the primary coil 210 to a modified frequency. After the change 722 of the operating frequency, the induced voltage caused by the operating frequency of the primary coil 210 has been reduced or eliminated. By reducing or eliminating the induced voltage in the key fob 204, the key fob 204 and the vehicle controller 604 are free to communicate. Thus, a low-frequency signal 726 transmitted 724 by the vehicle controller 604 can be received 728 by the key fob 204, and the key fob 204 may transmit 732 an ultra-high frequency signal 730 to the vehicle controller 604. The change 722 to the modified operating frequency may persist for a preset period of time or indefinitely, based on the nature of the signal. The modified frequency of the primary coil might then be changed back to the pre-modification operating frequency or the first frequency.

In another aspect, the transceiver of the primary-coil controller detects the ultra-high frequency signal transmitted by the key fob in an effort to engage vehicle operations. Upon detection, the primary-coil controller engages primary-coil frequency and power-shifting operations in anticipation of vehicle operations that are predicted to cause a change in the charging functions of the primary coil. Vehicle operations have been previously described herein. In further aspects, upon triggering vehicle operations, a change in voltage is detected by the primary-coil controller. The primary-coil controller might implement primary-coil frequency and power-shifting operations in response. Further operations described herein may be implemented by the primary-coil controller to maintain proper inductive charging of a secondary device.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and might be employed without reference to other features and sub-combinations. This is contemplated by and is within the scope of the claims.

Having thus described the invention, what is claimed is:

1. Non-transitory computer-readable media storing computer-executable instructions that, when executed, perform operations for avoiding inductive charging disruption comprising:
   detecting an event that is predicted to change a voltage supplied to a primary coil, wherein the change in voltage presents an increased likelihood of interrupting a charging function of the primary coil; and
   responsive to the event, avoiding interruption of the charging function of the primary coil by shifting a voltage of the primary coil to counteract the predicted change in the voltage supplied to the primary coil due to the event.

2. The media of claim 1, wherein detecting the event further comprises receiving a communication reporting the event.

3. The media of claim 1, wherein the change in voltage is detected in a power supply to the primary coil.

4. The media of claim 1, wherein the change in voltage is detected in the inductive power supply from the primary coil to a secondary coil.

5. The media of claim 1, wherein the change in voltage is triggered by a keyless entry device, a keyless ignition device, a key fob, or a smart key.

6. The media of claim 1, wherein shifting the voltage of the primary coil includes maintaining an amount of power inductively supplied from the primary coil at a level sufficient to charge a power supply coupled with the secondary coil.

7. The media of claim 1, wherein shifting the voltage of the primary coil is sustained for a preset period of time.

8. The media of claim 1, wherein duration of shifting the voltage of the primary coil is dynamically determined.

9. The media of claim 2, wherein the communication reporting the event is a notification from a vehicle controller.

10. The media of claim 2, wherein the communication reporting the event is a non-wireless communication.

11. A method for limiting inductive charging disruption, the method comprising:
    detecting a signal;
    measuring a frequency and amplitude of the detected signal;
    when it is determined that the measured frequency and amplitude of the detected signal will disrupt a charging function of a first coil by causing interference with an operating frequency of the first coil, changing the operating frequency of the first coil to create a margin between the operating frequency of the first coil and the frequency of the detected signal, wherein the operating frequency affects an amount of power inductively supplied from the first coil to a second coil; and
    when changing the operating frequency of the first coil, maintaining the amount of power inductively supplied from the first coil at a level sufficient to charge a power supply coupled with the second coil.

12. The method of claim 11, wherein changing the operating frequency of the first coil comprises adjusting one or more of the frequency, wavelength, amplitude, or pulse-width modulation (PWM) of the operating frequency.

13. The method of claim 11 further comprising, changing the operating frequency of the first coil back to a pre-modification state.

14. The method of claim 12, wherein changing the operating frequency of the first coil back to a pre-modification state is performed after a preset period of time.

15. The method of claim 11, wherein maintaining the level sufficient to charge a power supply coupled with the second coil further assists with avoiding a trigger of a power-loss indicator in a device containing the second coil.

16. An inductive coupling device for avoiding charging disruption, the device comprising:
    a primary coil that connects to a power source; and
    a controller that dictates primary-coil operations and that utilizes a processor to:
    receive an indication of an event that is predicted to change a voltage supplied by the power source to the primary coil, wherein the change in voltage presents an increased likelihood of interrupting a charging function of the primary coil; and
    in response to receiving the indication, avoiding the change in the charging function of the primary coil by modifying one or more operating parameters of the primary coil to counteract the predicted change in voltage supplied by the power source to the primary coil, wherein the one or more operating parameters include a voltage supplied from the primary coil to a secondary coil and another voltage supplied to the primary coil from the power source.

17. The device of claim 16, wherein the operating parameters include a frequency and a signal strength of the primary coil.

18. The device of claim 16, wherein the controller further utilizes the processor to maintain an amount of power inductively supplied from the primary coil to the secondary coil, wherein the amount of power is sufficient to charge a power supply coupled with the secondary coil, and wherein the amount of power is sufficient to prevent a power loss function from occurring in a device containing the secondary coil.

* * * * *